United States Patent
Douglass et al.

(10) Patent No.: US 7,337,214 B2
(45) Date of Patent: Feb. 26, 2008

(54) CACHING, CLUSTERING AND AGGREGATING SERVER

(75) Inventors: Michael Douglass, Austin, TX (US);
Douglas Swarin, Austin, TX (US);
Edward Henigin, Austin, TX (US);
Jonah Yokubaitis, Austin, TX (US)

(73) Assignee: YHC Corporation, Austin, TX (US)

( * ) Notice: Subject to any disclaimer, the term of this patent is extended or adjusted under 35 U.S.C. 154(b) by 821 days.

(21) Appl. No.: 10/672,189

(22) Filed: Sep. 26, 2003

(65) Prior Publication Data

US 2004/0122910 A1  Jun. 24, 2004

Related U.S. Application Data

(60) Provisional application No. 60/414,204, filed on Sep. 26, 2002.

(51) Int. Cl.
*G06F 15/167* (2006.01)
(52) U.S. Cl. ............... 709/214; 709/217; 709/219; 709/249
(58) Field of Classification Search ............ 709/203, 709/214, 217, 249, 247, 231, 219
See application file for complete search history.

(56) References Cited

U.S. PATENT DOCUMENTS

| | | | | |
|---|---|---|---|---|
| 5,815,663 | A * | 9/1998 | Uomini | 709/219 |
| 6,460,036 | B1 * | 10/2002 | Herz | 707/10 |
| 6,546,488 | B2 * | 4/2003 | Dillon et al. | 713/181 |
| 6,591,272 | B1 * | 7/2003 | Williams | 707/102 |
| 2002/0026507 | A1 * | 2/2002 | Sears et al. | 709/224 |
| 2004/0088412 | A1 * | 5/2004 | John et al. | 709/226 |
| 2004/0215709 | A1 * | 10/2004 | Basani et al. | 709/201 |
| 2005/0261985 | A1 * | 11/2005 | Miller et al. | 705/26 |

* cited by examiner

Primary Examiner—Frantz B. Jean
(74) Attorney, Agent, or Firm—Winstead PC

(57) ABSTRACT

A cluster of data caching servers that provide UseNet service to customers. The cluster of data caching servers cache articles and data requested by customers after retrieving the articles and data from a backend server/server farm. The cluster of data caching servers are adapted to share their cache memories with the other clustered servers in the cluster such that, if an article is requested by a client and the article has already been stored in one of the clustered server's cache memories, there is no requirement to retrieve all the requested article from the backend server.

27 Claims, 3 Drawing Sheets

CACHING, CLUSTERING AND AGGREGATING SERVER

CROSS-REFERENCES TO RELATED APPLICATIONS

This Application for Patent claims the benefit of priority from, and hereby incorporates by reference the entire disclosure of, co-pending U.S. Provisional Application for Patent Ser. No. 60/414,204, filed Sep. 26, 2002.

BACKGROUND OF THE INVENTION

1. Technical Field of the Invention

The present invention relates to Usenet servers, and more specifically, the present invention relates to the storage and retrieval of articles in a UseNet system.

2. Description of Related Art

UseNet server systems provide news services to clients. Conventionally, UseNet backend servers have been located remotely from the service providers that provide news services requested by clients. Thus, due to the remote location of the Usenet backend servers, news services have traditionally been slow and require a large amount of bandwidth between the UseNet service provider and the UseNet backend servers. This set up is both expensive and inefficient. Thus, what is needed is a UseNet server capable of providing news services at an increased speed with reduced costs.

SUMMARY OF THE INVENTION

An embodiment of the present invention provides a UseNet server system that operates as a pass-through caching Network News Transfer Protocol (NNTP) front-end system. No data or metadata need pass through the UseNet server system except as a result of a client request. In response to client requests, the system will first check servers in a local cluster of servers to determine if the requested data is available. If the requested data is available on a server in the local cluster of servers, then the UseNet system will connect to the server and retrieve the requested data. Otherwise, the UseNet system will determine which of a given number of unique backend server farms to connect to process the request in order to retrieve the requested data. When the requested data is passing from the backend server to the client, the UseNet system may cache the data and meta data within the local cluster of servers at the same time.

In certain embodiments, on a given host, any backend or cluster server connections established as a result of a request for data are maintained and reused by other processes within the local server, as they are needed. Depending on the configuration, an exemplary UseNet system can provide a different subset of groups and retention dates based on the source IP of the client and on other authentication information provided by the client.

In further embodiments, the authentication, authorization, and accounting are handled by a Secure Sockets Layer (SSL) encrypted Transmission Control Protocol (TCP) session back to an authentication server. An authentication server is a separate server that handles authentication processes related to the UseNet services. Cached articles can be stored in a compressed format in the local cluster servers. The cached articles can also remain in a compressed format when transferred between two servers. An exemplary UseNet server system can transparently handle most failures of the backend/cluster servers. In addition, the use of raw (non-mirrored) disks is possible through failure detection and mitigation of further use by the UseNet server system. Storage of data on the raw disks is done by using time-stamped buckets to provide needed retention and overwriting of cached articles based on the age of the data. Recycling of a previously used bucket into a new time frame does not wipe or erase the existing data until it is physically overwritten with new data.

In still further embodiments, a UseNet server system can be run in such a fashion that substantially none of the UseNet server software is stored on the server hardware. The software itself can be retrieved via a secure SSL connection using a Challenge Handshake Authentication Protocol (CHAP) based authentication technique to ensure that only authorized servers or systems may retrieve the software.

Embodiments of the exemplary clustered local servers allow the aggregation of multiple NNTP servers. The clustering of local servers enhances scalability because each clustered server is substantially the same operationally. In addition, connection, caching, and passing, of articles between the clustered UseNet servers reduce the connect/authenticate load on the backend servers. Through over-the-network compression between server clusters (backend server farms and clustered servers), the system can conserve additional network bandwidth above mere caching. Further, since the articles are already cached in the clustered local UseNet servers in a compressed format, there is no CPU time spent on decompressing from the cluster system and further no CPU time spent on recompressing on the local system as it caches the article.

Embodiments may have an advantage of only reading from the master servers on-demand, such that data is transferred from a backend server farm to a remote cluster of UseNet servers only if the data was requested by a client connected to the remote cluster of UseNet servers. The caching, clustering, and on-demand nature of exemplary software of the present invention enables a provision of service to a remote cluster of UseNet servers located at a client's location with assurances that the traffic the client will receive is less than or equal to a full feed.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the exemplary embodiments. However, it should be understood that these embodiments provide only a few examples of the many advantageous uses of the innovative teachings herein. In general, statements made in the specification of the present application do not necessarily delimit any of the various claimed inventions. Moreover, some statements may apply to some inventive features, but not to others.

Figure 1:
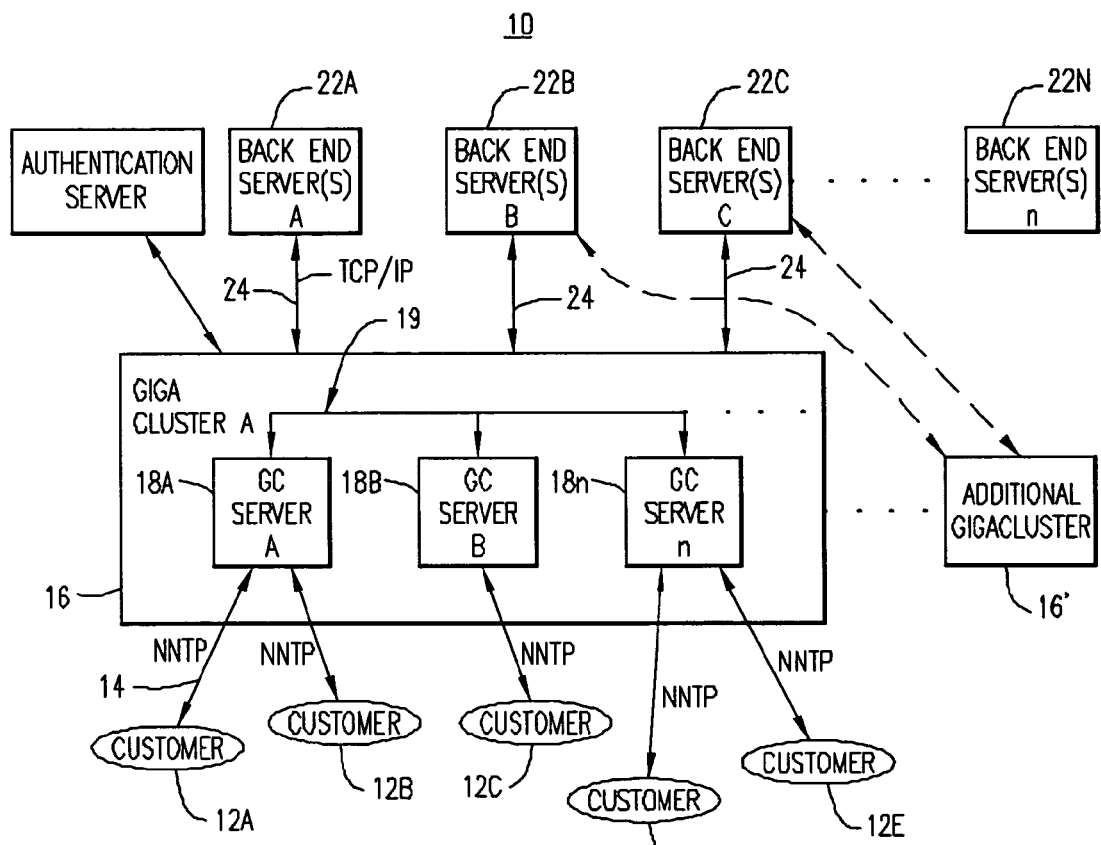
FIG. 1 is a block diagram of an exemplary UseNet server system.

Referring to FIG. 1, an exemplary UseNet server system 10 is shown in a block diagram. Customers or Clients 12A-12E are connected to the UseNet server system 10 via standard NNTP connections. The customers 12 can be a few to any number of customers who are connected to the Internet, an Internet Service Provider (ISP), or by another means for connecting to a UseNet service.

A local cluster of servers (Gigacluster) 16 is established having a plurality of local servers (GC servers) 18A-18n. Each GC server 18 can be a commodity server or substantially a standard server having memory, processor(s), and hard drives. It is understood that one or more of the GC servers 18A-n may have additional components or upgraded devices when compared with the other GC servers. For example, the different GC servers 18A-n each may different speed microprocessors, larger or faster hard drives, upgraded electronics, etc when compared to each other. Although FIG. 1 only depicts three GC servers 18A-n there can be substantially any number of GC servers 18A-n operating within the Gigacluster 16. Each GC server 18 is connected or in electrical or optical communication 19 with each one of the other GC servers 18A-n.

The Gigacluster 16 is connected to or is adapted to be in electrical or optical communication with various backend servers 22A-n. In general a Gigacluster 16 is connected via a TCP/IP connection(s) 24 to the backend servers 22A-n. Each backend server 22 may each be a plurality of servers such that backend server 22A represents two or more servers (i.e., a server farm). The backend servers 22A-n may be located in locations that are distant or remote from the other backend servers 22A-n. Also each backend server may be located distant or remote from the Gigacluster 16. For example, backend server 22A may be located in Austin, Tex., backend server 22B may be located in Baltimore, Md., and backend server 22C may be located substantially in London, England. Other backend servers or backend server farms 22A-N may be located anywhere in the world.

There may also be additional Gigaclusters 16' that are connected to one or more of the backend servers 22A-n. The additional Gigaclusters 16' may be remotely located from both the backend servers 22A-n and the Gigacluster 16. A backend server may also be a Gigacluster.

The backend servers 22A-n receive and store articles for many UseNet user groups. The size of the data storage space required in each of the backend servers 22A-n depends on the amount of UseNet article retention that is desired. At the present time, a single day's worth (24 hours) of UseNet articles fills, on the average, approximately 750 to 1,000 Gigabytes of storage space on the backend servers 22A-n. In order to increase the retention to more than one day's worth of UseNet article postings, the size of the backend storage space on the backend servers 22A-n must increase according to the number of days or the amount of time retention is desired. Furthermore, embodiments of the present invention allow each UseNet client to specify the amount of retention time or the amount of retention space desired for their UseNet groups. For example, some UseNet user groups or Use Net clients may want to have a month's worth of retention for their specific UseNet user group(s), others may want more or less retention time or storage space.

As the activity of the UseNet increases so does the number of UseNet articles and postings. To date activity on the UseNet has increased steadily since the UseNet's beginnings. It is expected that the storage requirements on the backend servers 22A-n will increase from the present 750 Gigabytes per day to more than 1000 Gigabytes per day for each backend server (farm) over the next year. The backend servers 22A-n will require continuous storage upgrades in order to provide enough article retention time that satisfies customers, clients, and UseNet users. The output bandwidth from the backend server 22A-n necessary on the TCP/IP connections 24 between the Gigacluster 16 and backend servers 22A-n becomes insufficient to handle the necessary data rate of more than 200 to 300 Mbps. Thus, as the amount of data storage is increased on at least one of the backend servers 22A-n, then the amount of data that needs to be transferred between the backend servers 22A-n and a Gigacluster 16 also increases due to the growing needs of users and clients. As a result, the data connection between each of the backend servers 22A-n and the Gigacluster becomes a limiting factor. All of the necessary data cannot be transferred over the TCP/IP connection 22 resulting in data retrieval delays. The end result on the UseNet is delays to the client and user. The present day backend servers cannot move the amount of data requested by today's UseNet users in a timely fashion. It is noted that each backend server (farm) 22A-n generally stores substantially the same information as the other backend servers or the backend servers are divided up into several server farms each containing a subset of the same information.

Exemplary embodiments of the present UseNet server system use the servers (GC servers 18A-n) in the Gigacluster 16 to store or cache articles that were recently requested by a customer 12 and that were retrieved from a backend server 22. By retrieving articles from one or more backend servers 22A-22n, the Gigacluster 16 and its associated GC servers 18A-n transparently aggregate multiple backend servers 22A-n, wherein each backend server is responsible for a distinct subset of UseNet groups.

Furthermore, by caching data retrieved from the back end servers and having the cached data available to customers upon request, the GC servers 18A-n reduce the load on the backend servers 22A-n and the TCP/IP buses' 24 bandwidth between the backend servers 22A-n and the Gigacluster 16.

Each GC server 18 is in communication 19 with the other GC servers 18A-n within the Gigacluster 16. The GC server 18A-n may communicate with each other using one or more various or a combination of different technologies including, but not limited to hard-wired technologies, network technologies, wireless technologies, optical technologies, satellite technologies, and other types of networking technologies and protocols. The GC servers 18A-n may utilize an ethernet 19 or other form of electronic communication within their cluster 16. The electronic communication 19 between the GC servers 18A-n also allows the GC server 18A-n, when the appropriate backend server is contacted via the TCP/IP connection 24, to retrieve the article or data from a backend server 22.

When a connection to a backend server 22A or to another GC server 18B connection is made by a GC server 18A, the GC server 18A retains and maintains the connection so it can be reused as needed in the future for additional movement of stored articles or data to a customer 12. Retaining and maintaining connections between the various servers (backend and GC server 18A-n) saves time and conserves the various CPU's resources necessary for creating and breaking down any given data communication connection between servers.

New UseNet articles or new data tends to be read or downloaded by customers much more often than older UseNet articles or data. By storing or caching recently retrieved articles or data in the GC server 18A-n when they are being retrieved from the backend, then, in general, newer or more popular articles are being stored on the GC server 18A-n. The result of storing the retrieved articles in the GC server 18A-n is that retrieval of the more popular or frequently read articles and data do not use the bandwidth of TCP/IP connections 24 or the backend servers 22A-n after the frequently requested article or data has been retrieved from the backend once. The technique decreases the time required to retrieve popular or frequently requested articles. This technique of caching previously retrieved articles on the GC server 18A-n also decreases and/or completely removes the delay seen by the customer when retrieving data from UseNets having inadequate TCP/IP bandwidth between the UseNet Servers and their associated backend servers.

Due to the limitations of the backend servers 22A-n being able to push data to the customers via the TCP/IP connections 24, the GC server 18A-n with the cached or stored articles increase the throughput. The concern of any UseNet system is how much data in a given amount of time can be provided to the customers.

A backend server 22A-n and a GC server 18 are somewhat different types of servers. A backend server 22A, for example, may be very heavy in storage space and be able to move about 200 Megabits per second over a TCP/IP connection 24 to the Gigacluster 16. The storage space of a backend server is unusually expensive because of the storage capacity and the high quality of the drives. The large storage capacity and high quality are required due to the amount of usage the drives endure. A backend server 22A or farm of servers 22A may have anywhere from twelve terabytes to at least 40 terabytes of disk space. In a present day backend server farm 22 requires about 750 to 1000 Gigabytes of disk space (storage) to store a single day's work of UseNet data. It is understood that the storage space on the servers may be hard drive, disk, optical, holographic, tape, magnetic, bubble, solid state or any other applicable storage media. As UseNet usage continues to grow additional hard drives must be added to the backend server or server farm just to maintain the same amount of article retention time. As a result, backend servers tend to be one of the most expensive types of servers. Backend servers are heavyweights when it comes to storage capacity, but are lightweights when it comes to being able to move all their stored data around. One can say that the ratio of data capacity to the amount of data that can be moved per second is a large number. For the smaller example backend server discussed above, the ratio is 4000 Gigabytes to 200 Megabits/second. Thus, there is a 20,000:1 relationship of storage of customer traffic. This ratio will increase with the size of the backend server 22 or server farm 22.

On the other hand, each GC server 18 can, in general, be a commodity server. In the present day, a commodity server or standard general use server is much less expensive than a storage-capacity-heavy backend server. In the present day, a commodity server can move data at about 200 Mbps (similar to a backend server). A present day commodity server has between about one half of a terabyte to two and a half terabytes of disk memory. Thus the ratio of data capacity to the amount of data that can be moved per second is a smaller and more balanced ratio of 2.5 terabytes to 200 Mbps (12500:1) than the ratio of an exemplary backend server. This is a much lower ratio than the backend server's ratio of 20,000:1. Thus, a GC server 18 is more capable of quickly finding data in its memory and moving all or a large percentage of the data stored in memory over time than a backend server 22.

An exemplary Gigacluster 16 is formed such that each GC server 18 has about 2.5 terabytes of storage and each GC server 18 offers about 200 Mbps of data throughput to the many customers using the UseNet. If there are, for example, 20 GC servers 18A-n in the Gigacluster 16, then collectively there is 50 terabytes of storage for storing cached articles and data. Furthermore, the GC server 18A-n collectively have the capacity of moving 200 Mbps times 20 servers equaling about 4000 Mbps (4 Gbps) of data to the customers.

Since the GC server 18 is caching or storing articles or data not found in any of the other GC server 18A-n within the Gigacluster 16, the new or most popular articles and data tend to be stored in the GC server 18A-n after being retrieved from the backend. Thus, the GC server 18A-n can provide, when requested, the popular or new articles to the customers 12 without querying the backend servers 22A-n. This exemplary technique of clustering the GC server 18A-n frees up bandwidth between the Gigacluster 16 and the backend servers 22A-n.

To further increase the efficiency of an exemplary UseNet system, the articles or data can optionally be transmitted in a compressed format when transferred between servers. The articles stored in the GC servers' cache can be stored in the same compressed format as they were transferred in. Sending and storing articles in a compressed format saves transmit and receive time, decreases the amount of storage space required for each article, provides a savings in CPU processing time in both the transmitting and receiving server, and uses less bandwidth of the connection between servers.

Another important aspect of an embodiment of the present invention is how retention of stored articles and data is maintained by the GC server 18A-n as well as the backend servers 22A-n. Exemplary embodiments may provide different views of the UseNet to different customers depending on the UseNet service required by the client or customer. For example, an exemplary UseNet system is able to provide a view of or access to only preselected UseNet group's articles or data. That is, if there are five thousand separate UseNet groups, a customer or client may only have access to 100 of them.

Furthermore, an exemplary UseNet system may provide different amounts of retention access to different clients or customers. One customer may have access to the full article and data retention maintained by the exemplary UseNet system. Another customer may have access to a lesser amount of article and data retention.

An exemplary UseNet system offers the design and implementation of multiple redundant backend servers 22A-n and networks. Thus, the failure of any single backend server is contained and transparently handled by a smooth failover of connectivity within a backend selection code mechanism.

An exemplary UseNet system does not necessarily need to operate as a primary news-server and further does not need to take a constant feed of articles from any source. Instead, the UseNet system may be located at a client location. When deployed in a client's location, in a client's network facility the GC server 18A-n may be deployed as a secondary cache which connect into the core systems through the in-house primary cache systems located in the primary network facility.

An exemplary UseNet system uses an article and data storage mechanism, in the form of software, on each GC server 18 and each backend server that is commonly referred to as Just a Bunch of Disks (JBOD). JBOD implies that each article cache within each GC server 18 does not have a redundancy copy of the cached articles. However, because of the ability of any GC server 18 to access an article from another GC server 18 in the Gigacluster 16 via the ethernet 19 or access the backend servers 22A-n for an article via the TCP/IP connection 24, then if a storage (i.e., hard drive, solid state memory) failure occurred in one GC server 18A, then the GC server 18A can continue to function by contacting its Gigacluster peers (the other GC server 18A-n in the Gigacluster 16) or the backend servers 22A-n to obtain articles requested by a customer 12.

Each memory device or hard drive for storing articles and data are logically divided into smaller sized data storage units called spools. The spools are further assigned (on a dynamic basis) to store articles and data dated within a constant time interval; when the spools are assigned a time interval, then the spools are said to be assigned to that time interval's "bucket".

Once a spool is assigned to a specific time-interval's bucket, the spool will only allow articles that fall within the specific time-interval to be stored in the spool's drive space.

If an article arrives for which there are no spools to store the article (the time interval's bucket is empty or all spools in the bucket are full) then the server containing the spool will attempt to recycle a spool from the oldest bucket in the same server.
  a. If there are no non-empty time-interval buckets older than the article, then the article is not cached in the GC server.
  b. If there are non-empty time-interval buckets older then the article, then a spool from the oldest non-empty time-interval bucket is moved to the time-interval bucket is moved to the time-interval bucket for the currently received article. This action is known as "recycling a spool".

When a spool is recycled from one time-interval bucket to a newer time-interval bucket the articles stored in that spool for the old time-interval bucket are not lost until they are physically overwritten by new incoming articles.

Hard drives, by their very nature, are commonly failed hardware components. Further, each GC server 18 employed provides no software or hardware mirroring that protects the articles cached in a GC server 18. To prevent a failed hard drive from affecting the performance of an exemplary UseNet system, each GC server 18 continually monitors for read/write failures through normal operations on each drive. When an allowed threshold of failures for a drive has been reached, the GC server 18 or a master server will tag, in a metadata file, the fact that the drive has failed and all further access to that drive will immediately cease. The drive is treated as if it never existed.

When a hard drive is replaced, a detection method is employed by which the specific device can be re-enabled.

Each GC server 18 employs the use of a number of metadata pieces of information that would not allow proper system functionality if that data were to be lost by a sudden loss of a hard drive. For this metadata, each GC server 18 employs the use of software mirroring to protect from the failure of the GC server's hard drives.

Remotely deployed Gigaclusters 16' and/or GC server 18A-n utilize a boot floppy at the location of the system's bootable kernel. There is little or no software stored on the actual deployed systems. The system software is specifically not located on any floppy or hard drive in any deployed GC server 18. The software is obtained via an SSL connection back to a distribution server where the remote system is authenticated and authorized to retrieve the software. The software is then stored in a memory-only file system in an effort to prevent the theft of the software itself The configuration file for the system is also retrieved on a system-by-system basis via a remote SSL based distribution system. The configuration file is generated on the fly and signed for authenticity using a DSA signature algorithm.

Figure 2:
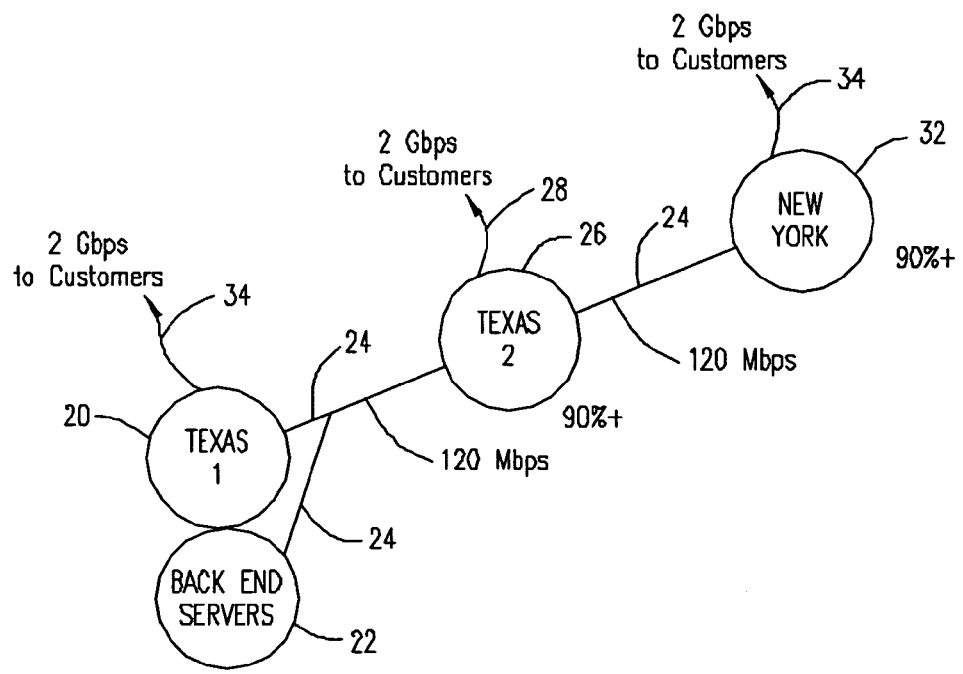
FIG. 2 is diagram depicting an exemplary UseNet geographic configuration.

FIG. 2 provides a diagram depicting an exemplary UseNet geographical configuration. The exemplary use of cached data and articles within spools on each GC server 18 with a Gigacluster 16 provides economic savings to the UseNet system provider. FIG. 2 depicts a first Gigacluster 20 located in a first geographical location Texas1. A first backend server/server farm 22 is located in substantially the same geographical location as first Gigacluster 20. A second Gigacluster 26 is located in a second geographical location called Texas2. A third Gigacluster 32 is located in a third geographical location called New York. As such, the first, second and third Gigacluster 20, 26 and 32 are distant from each other. Also, the second and third Gigaclusters 26 and 32 are geographically distant from the first backend server/server farm 22.

A TCP/IP connection is adapted to connect the plurality of Gigaclusters 20, 26, 32 to each other and to the first backend server 22 via, for example, the internet or a worldwide computer system (not specifically shown). Each of the three exemplary Gigaclusters is part of a UseNet provider's UseNet system. Gigacluster 20 uses the first backend server 22 for retrieving articles and data not located in the individual Gigacluster 20. Gigacluster 26 uses the Gigacluster 20 for retrieving articles and data not located in the Gigacluster 26. Gigacluster 32 uses the Gigacluster 26 for retrieving articles and data not located in the Gigacluster 32.

Assuming that each Gigacluster 20, 26, 32 has been operating in substantially a steady state for a period of time, then the GC server 18A-n within each of the separate Gigaclusters will have cached the most popular and most recent articles and data.

At present, the TCP/IP 24 connection rate between each of the Gigaclusters and the backend server 22 is about 120 Mbps (Megabits per second). If the Gigaclusters did not cache the most requested articles at each geographical location, then they would have to share the 120 Mbps TCP/IP connection to receive each and every article requested by the customers.

If each Gigacluster can push about 2 Gbps (Gigabits per second) to each Gigacluster's associated clients and customers, then the TCP/IP connection could never keep up with the needs of each Gigacluster. Furthermore, a long haul TCP/IP connection becomes costly to the UseNet provider when the TCP/IP bandwidth is used to its maximum extent.

In the exemplary embodiment, and via experimentation on the part of the inventors, it was discovered that the use of caching in the GC server 18A-n of each Gigacluster of a UseNet system greatly decreased the need (and the cost) of using a TCP/IP connection to retrieve client requested articles from a backend server. In fact, in greater than 20% of the requests by customers, the GC servers 18A-n, of a given Gigacluster, did not have to use the TCP/IP connection to retrieve an article or data from the backend servers 22A-n. Instead, one or more of the GC servers 18A-n within the given Gigacluster had the requested article or data in cache and was able to provide it to the requesting GC server 18, which in turn provided the requested article or data to the customer.

In exemplary embodiments of the present invention and as a result of experimental operations of an embodiment of the present invention, the percentage of requested articles and data found in cache on the GC server 18A-n in a Gigacluster operating in a steady state ranged from at least 20% to about 90%. In other words, the cache storage of the clustered GC server 18A-n within a given Gigacluster have a cache hit ratio of about 20 to 90 percent when operating in steady state. A cache hit ratio can be defined as the amount of articles and data that can be provided to the customers of a Gigacluster via the GC server 18A-n compared to the amount of articles and data that can be retrieved from the Gigacluster. This excellent cache hit ratio greatly decreases the costs of using a TCP/IP connection to a backend server farm, increases the efficiency of the UseNets system, and decreases the wait time UseNet customers experience during peak operating hours of a UseNet.

Exemplary embodiments of the present invention have provided both unexpected results and have answered a long need for a solution to keeping UseNet system costs under control without diminished service to customers and clients in the form of delays to their UseNet article requests. Furthermore, exemplary embodiments of the invention are enjoying immediate commercial success in that the UseNet service that has recently begun employing one or more embodiments of the present invention has become more profitable and has found their UseNet service in higher demand by customers because of the new level of service offered at a competitive price.

Figure 3:
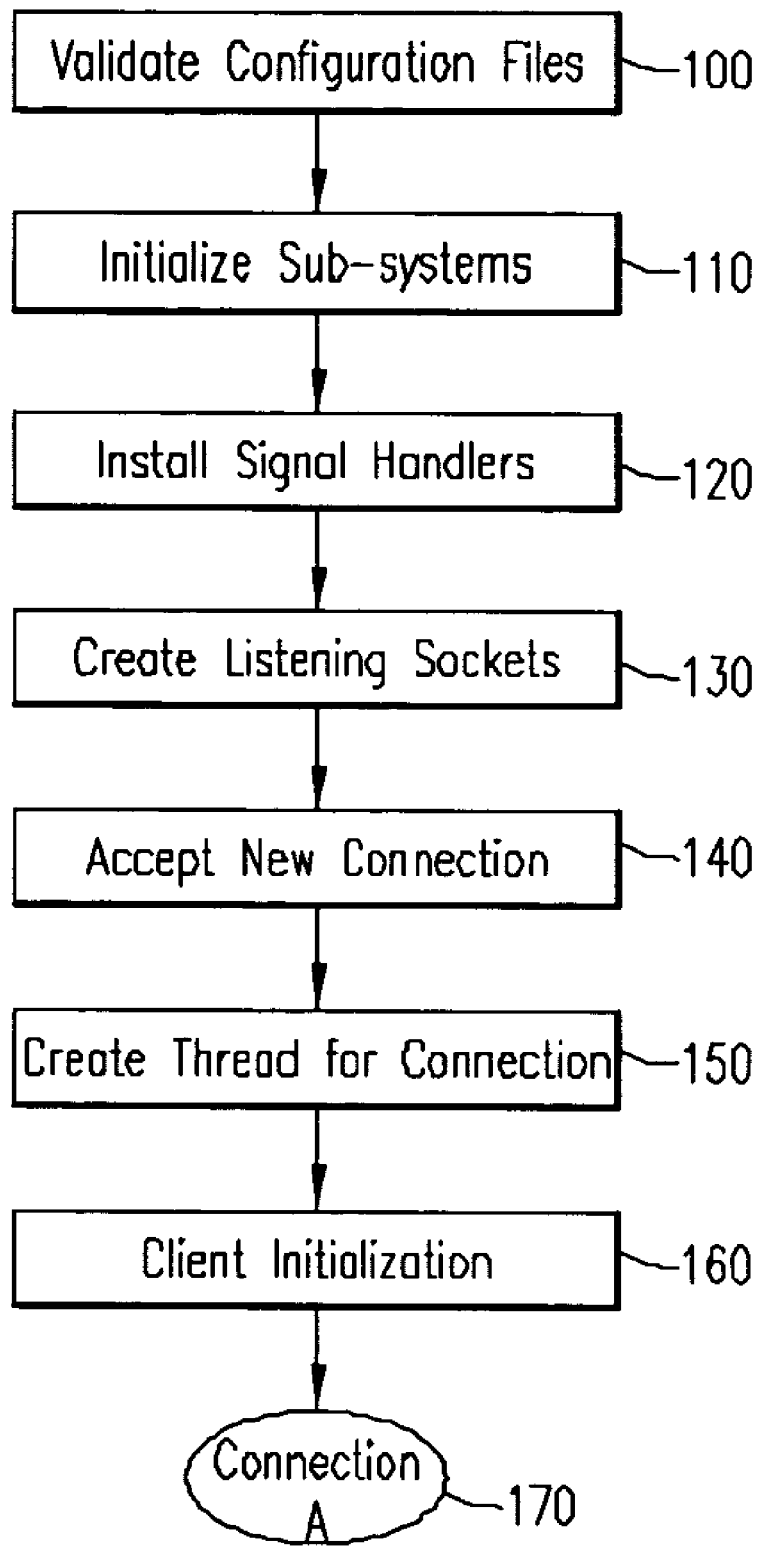
FIG. 3 is a flowchart illustrating exemplary steps for initializing the system of the present invention.

Referring now to FIG. 3, to initialize an exemplary UseNet system, at step 100, configuration files for each GC server 18 are read and validated for correctness and authenticity using DSA signature algorithm. At step 110, various subsystems are initialized. For example, if a GC server 18 is configured to use SSL for authentication, an SSL key can be loaded and certified into memory, and SSL contexts can be initialized. If any part of the initialization fails, an error can be logged and the process terminates. As another example, JBOD (cyclical) spool metadata can be initialized if cyclical spools are configured in the system. To initialize JBOD spool metadata, each GC server 18 can run a test to determine if the cyclic spool shared memory metadata is already configured. If not, the metadata from the cyclic spools can be read into a shared memory segment, verifying each spool with a checksum. If the checksum fails, the spool can be initialized as a new spool. Further updates to the cyclic spool metadata can be written to both shared memory and disk. All reads of metadata are preferably from the shared memory segment, for speed purposes.

Thereafter, at step 120, the system can install signal handlers for various error conditions and termination requests. At step 130, the system can create listening sockets for NNRP services. Thereafter, at step 140, the Gigacluster can wait for and accept a new connection from the various listening sockets. At step 150, the new connection forks a new process (The Child). The Parent process waits for the termination of The Child, and then closes the newly accepted socket and restarts the socket accept loop at step 140. The Child Process forks (creating The Grandchild) and immediately exits. The Grandchild closes all listening socket descriptors, and at step 160, initializes the customer or client by initializing various settings for a generic, unauthenticated session and using the IP address from which the session was created to authenticate the customer or client. Thereafter, at step 170, the Grandchild executes software for handling the connection.

To authenticate the customer or client, the system compares the IP address of the customer or client to a list of "always allowed chainers" addresses, and upon match, sets a session cookie and session tag to both read "chainer", sets permissions to allow READING and indicates NO-IDLE-TIMEOUT during client command reading. If no username and password is provided, the system generates a connection authentication request with just the IP address of the customer or client. Otherwise, the authentication request includes the IP address of the customer or client, as well as the username and password provided by the customer or client. If the GC server 18 is not already connected to the centralized authentication server, the GC server 18 connects to the authentication server.

Next, the GC server 18 negotiates SSL parameters if the configuration indicates SSL requirements. On any error or failure to connect, the process terminates. If no errors occur, the GC server 18 sends a request to the authentication server and reads the response. If a GC server failure is detected in the transaction with the authentication server and the connection has not already been retried, the system disconnects from the authentication server and attempts to reconnect. If the second attempt fails, the process terminates. If authentication is not successful, the GC server 18 returns a message to the client indicating such. Otherwise, the GC server 18 records the returned cookie and tag along with the username and IP address of the session for future use in accounting procedures.

Figure 4:
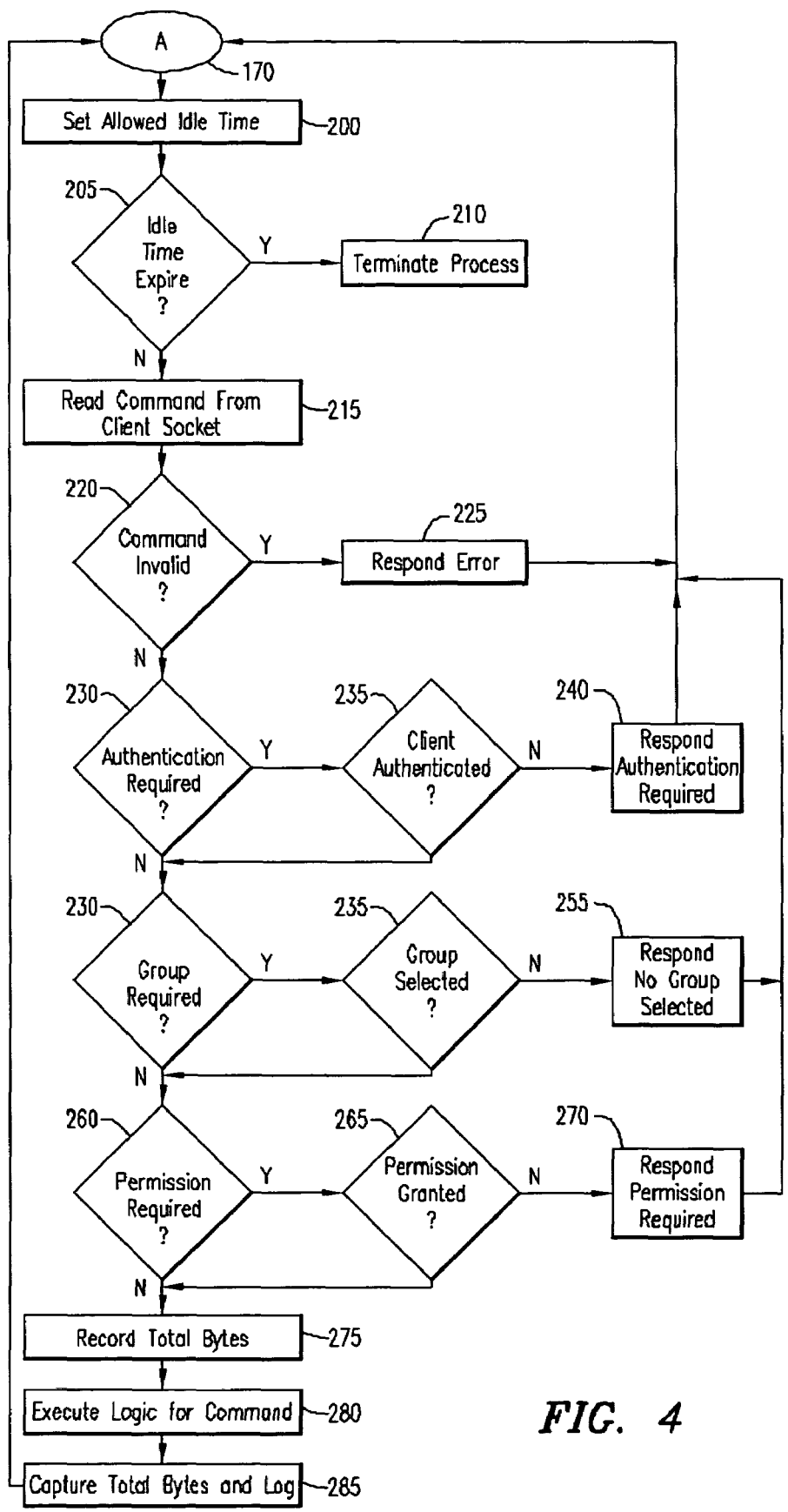
FIG. 4 is a flowchart illustrating exemplary steps for enabling the clustering and caching process provided by the system of the present invention.

Referring now to FIG. 4, at step 170, to handle the connection, at step 200, the GC server 18 determines the allowed idle time when waiting for a command from the customer or client. At step 205, if the idle time expires before a command is read, the process terminates at step 210. If the idle time does not expire before receipt of a command, at step 215, the GC server 18 reads a single command from the customer or client socket. At step 220, if the command is invalid, at step 225, the system responds with "500 syntax error or unknown command" and restarts the connection handling process. At step 230, if the command requires authentication and, at step 235, the customer or client is considered unauthenticated, at step 240, the system responds with "480 authentication required" and restarts the connection handling process.

At step 245, if the command requires that a Use group be selected and, at step 250, no group has been selected by the remote client, at step 255, the system responds with "412 no group selected" and restarts the connection handling process. At step 260, if the command requires permission and, at step 265, that permission is not granted to the customer or client, at step 270, the GC server 18 responds with an appropriate error and restarts the connection handling process.

Otherwise, at step 275, the GC server 18 records a snapshot of the total bytes transferred to-date during this session ("bytes"). At step 280, using "GC—Client Dispatch Table" shown below, the system executes the specified logic depending upon which command has been specified by the customer or client, as shown in more detail below. After execution of the specified logic, at step 285, the system captures a new snapshot of the bytes transferred and logs the command executed, the number of bytes transferred for the command, and the calculated rate of transfer. This process is repeated for the duration of the session connection.

At the termination of the session, if there is no authentication cookie recorded for this customer or client connection, the process terminates. However, if the cookie is a "chainer", the GC server 18 zeroes out the counters for the session and terminates the process. If there is an authentication tag associated with the connection and there were some amount of bytes delivered to the customer or client, the GC server 18 determines whether a connection to the centralized authentication server is active. If so, the GC server 18 generates an accounting packet necessary to associate the used bandwidth to the account information for the client. If successful, the GC server 18 logs this information in a "real-time" logfile indicating that the account was handled in real-time. Otherwise, the GC server 18 logs the information in a "post-processed" logfile for processing at a later point in time by external processes. Also, if the connection to the authentication server is active, the GC server 18 sends a disconnect message with the cookie, IP, user, and tag of the connection.

The following is an exemplary client dispatch table. Exemplary process flows for each command are shown in more detail below.

| GC - Client Dispatch Table | |
|---|---|
| Command | Flow to Execute |
| ARTICLE | GC - Client Command ARTICLE |
| AUTHINFO | GC - Client Command AUTHINFO |
| BODY | GC - Client Command BODY |
| DATE | GC - Client Command DATE |
| GROUP | GC - Client Command GROUP |
| HEAD | GC - Client Command HEAD |
| HELP | GC - Client Command HELP |
| LAST | GC - Client Command LAST |
| LIST | GC - Client Command LIST |
| LISTGROUP | GC - Client Command LISTGROUP |
| MODE | GC - Client Command MODE |
| NEWGROUPS | GC - Client Command NEWGROUPS |
| NEWNEWS | GC - Client Command NEWNEWS |
| NEXT | GC - Client Command NEXT |
| POST | GC - Client Command POST |
| STAT | GC - Client Command STAT |
| XHDR | GC - Client Command XHDR |
| XOVER | GC - Client Command XOVER |
| XPAT | GC - Client Command XPAT |
| QUIT | GC - Client Command QUIT |

GC—Client Initialization
1. Initialize various settings for a generic, unauthenticate session.
2. Execute "GC—Client Authenticate" with the IP address from which the session was created.

GC—Authentication System Initialization
1. If configured to use SSL for authentication, load SSL key and certificate into memory and initialize SSL contexts. If any part of the initialization fails, log an error and execute "GC—Terminate Process".

GC—Client Authenticate
1. If this is the first time "GC—Client Authenticate" has been executed in this client process, register "GC—Auth Fini" for running at process termination time for cleanup purposes.
2. Compare the IP address of the client to a list of "always allowed chainers" addresses and upon match, set session cookie and session tag to both read "chainer", set permissions to allow READING and indicate NO-IDLE-TIMEOUT during client command reading. Exit this flow.
3. Build an authentication request under the following logic:
   A. If no username and password is provided, generate a connection authentication request with just the IP address of the client.
   B. Else, build an authentication request with the IP address of the client, as well as the username and password provided by the client.
4. If not already connected to the centralized authentication server, connect to the server. Negotiate SSL parameters if the configuration indicates SSL requirements. On any error or failure to connect, execute "GC—Terminate Process".
5. Send request to authentication server and read response.
6. If a system failure is detected in the transaction with the authentication server and we have not retried the connection once, disconnect from the server and return to step #4 above. Note that only one retry is attempted. If the second attempt fails, execute "GC—Terminate Process".
7. If authentication is not successful, return a message to the client indicating such. Exit this flow.
8. Record the returned cookie and tag along with the username and IP address of the session for future use in accounting procedures.

GC—Auth Fini
1. If there is no authentication cookie recorded for this client connection, exit this flow.
2. If the cookie is "chainer", zero out the counters for this session and exit this flow.
3. If there is an authentication tag associated with the connection and there were some amount of bytes delivered to the client, perform the following logic:
   A. If a connection to the centralized authentication server is active, generate an accounting packet necessary to associate the used bandwidth to the account information recorded in the "GC—Client Authenticate" flow. If successful, log this information in a "real-time" logfile indicating that the account was handled in real-time.
   B. Otherwise, log the information in a "post-processed" logfile for processing at a later point in time by external processes.
4. If the connection to the authentication server is active, send a disconnect message with the cookie, IP, user, and tag of the connection as recorded by the "GC—Client Authenticate" flow.

GC—Terminate Process
1. Run all registered flows for termination cleanup.
2. Terminate the process.

GC—Client Command DATE
1. Generate and send the following response to the client: "111 YYYYMMDD HH:MM:SS".

GC—Client Command HELP
1. Respond with "100 help" followed by GC software version information.
2. Continued response with static help information for the commands available to the client under the current authentication state.
3. Terminate the response with ".\r\n".

GC—Client Command MODE
1. If the mode is "READER", respond with "200" followed by the name of the news server site as configured by the operator.
2. If the mode is "GC—COMPRESS", and the connection is authorized to use this mode, flag the session as able to receive compressed copies of articles and respond with "200 Compressed Transfers Enabled".
3. For all other mode requests, respond with "500 syntax error or unknown command".

GC—Client Command NEWNEWS
1. Respond with "502 newnews permission denied (command disabled)".

GC—Client Command XPAT
1. Respond with "501 xpat not supported".

GC—Client Command QUIT
1. Respond with "205 goodbye".
2. Close client socket.
3. Execute "GC—Terminate Process".

GC—Client Command AUTHINFO
1. If less than 2 parameters are passed to AUTHINFO, respond with "501 bad authentication".
2. If type is USER, record the desired username.
3. If type is PASS, record the password.
4. If type is not USER and type is not PASS, respond with "501 bad authentication" and exit this flow.
5. If both a desired username and a password have not been received, respond with "381 more authentication required" and exit this flow.
6. Execute "GC—Client Authenticate" with the client's IP address, desired username, and specified password.

GC—Client Command GROUP
1. If the group fails to pass basic sanity checks, respond with "411 no such group" and exit this flow.
2. If the client is not allowed (by configuration and authorization) to see the specified group, return "411 no such group" and exit this flow.
3. Execute "GC—Select Backend Server" with the group in question.
4. Get cached information for the group (including lo and hi article numbers in the group).
5. If the command indicates that we should only respond with cached information OR the timestamp on the cached information is less than a configurable amount of time old, execute this logic:
   A. If there are retention restrictions on this session, adjust the lo-bound returned to reflect this.
   B. Respond with "211<article-count><lo-bound><hi-bound>" where article-count is an estimate count of articles in the group, and the lo-bound (as modified by 5A above) and hi-bound are from the cached information on the group.
   C. Exit this flow.
6. Connect to the backend-server and send the GROUP command to it.
7. Process the response and if the response code is not 211, pass the response back through to the client and exit this flow.
8. Parse the response and cache the new lo and hi bounds for the group in the group's metadata file.
9. Pass the server's response back to the client.

GC—Client Command LAST
1. If the current client article number is less than either the lo bound on the group OR less than the allowed retention lo bound, set the current client article number to the allowed minimum.
2. Connect to the backend-server and send a STAT command with the current client article number. Receive the response and ignore it.
3. Send a LAST command to the server. If the response code is 223:
   A. Set the current client article number to the article number indicated.
   B. Pass the response back to the client and exit this flow.
4. Respond to the client with "422 no previous article".

GC—Client Command NEXT
1. If the current client article number is less than either the lo bound on the group OR less than the allowed retention lo bound, set the current client article number to the allowed minimum.
2. If the current client article number is greater than the hi bound on the group, set the current client article number to be the group's hi bound.
3. Connect to the backend-server and send a STAT command with the current client article number. Receive the response and ignore it.
4. Send a NEXT command to the server. If the response code is 223:
   A. Set the current client article number to the article number indicated.
   B. Pass the response back to the client and exit this flow.
5. Respond to the client with "422 no next article".

GC—Client Command STAT
1. If the argument is non-numerical, select an appropriate backend server for the currently selected group. Send the STAT command straight through to the backend server and pass the response to the client. Exit this flow.
2. If the argument is numerical or no argument was passed and there is no currently selected group, respond with "412 no group selected" and exit this flow.
3. If the argument is numerical, retrieve the variable retention lo-bound for the current group and if the argument is less than the retrieved value, respond with "423 no such article in group" and exit this flow.
4. If no argument was given to the command, send "stat #" where # is the value of the current client article number.
5. Else, send "stat #" where # is the value passed as the argument.
6. Return the response from the backend to the client.

GC—Client Command NEWGROUPS
1. If multi-server mode is not enabled, send the newgroups command to the backend server and pass the response on unaltered to the client. Exit this flow.
2. Parse the arguments to NEWGROUPS and retrieve the offset into the cached ACTIVE file for groups created on or after the specified timestamp.
3. Open the ACTIVE file, seek to the specified offset.
4. Respond with "231 newgroups follow"
5. Read from ACTIVE file until EOF and send all data to the client.

GC—Client Command POST
1. Connect to an appropriate backend server for posting (if postd is enabled, the backend server will be a posting-only server).
2. Send POST to the backend server.
3. Respond to client with "340 send article".
4. If postd is enabled:
   A. Send postd specific headers followed by a blank line.
   B. Send NNTP-Posting-Host and NNTP-Posting-Date as client headers.
5. Read the headers from the client, for each header perform the action specified by "GC—Post Header Filter".
6. If any errors occurred during header processing, send "441 posting failed" to the client and discard remaining data from the client until the end of the post is detected. Disconnect from the backend server and exit this flow.
7. If postd is enabled:
   A. If no message-id header was sent by the client, generate a unique message-id and send this header to the backend server.

B. If no date header was sent by the client, generate and send an appropriate date header to the backend server.
8. If postd is not enabled:
   A. Generate an encrypted trace line called "X-GC-Trace" including information necessary to allow the secured ability to identify the true poster.
9. Terminate the headers by sending a blank line to the backend server.
10. Pass the remainder of the post (the body of the article) from the client straight through to the backend server until terminated with ".\r\n".
11. Return resulting response from backend server to the client.
12. Disconnect from the backend server.

GC—Client Command LISTGROUP
1. If no arguments were passed and there is no current client group selected, respond with "412 no group selected" and exit this flow.
2. If an argument does exist:
   A. Execute "GC—Client Command Group" with the specified argument with the exception that NO responses generated from the execution of this subflow is allowed to reach the client.
   B. If the newly set client group is empty or is non-existent, respond with "411 no such group".
3. Get cached metadata (including the lo- and hi-bounds) for the group in question. Adjust the lo-bounds as necessary for any retention-specific configuration.
4. Respond to the client with "211 article numbers follow".
5. Respond with the articles from lo-bound to hi-bound with one number per line incrementing by 1 on each successive line.
6. Terminate the response with ".\r\n".

GC—Client Command LIST
1. Initialize listexpire to 900.
2. If multi-server mode is enabled:
   A. If the first argument is ACTIVE, execute "GC—Multi-Server LIST ACTIVE" with the remaining arguments to it. Exit this flow.
   B. If the first argument is ACTIVE TIMES, set listexpire to 0.
3. If there was an argument passed in, execute "GC—Retrieve Cached List" with the specified argument and listexpire value. Return the cached data to the client and exit this flow.
4. Otherwise, pass the command verbatim to the backend server and return the response unmodified to the client.

GC—Multi-Server LIST ACTIVE
1. If there is no argument passed in:
   A. Execute "GC—Retrieve Cached List" with ACTIVE as the argument and 0 as the listexpire parameter.
   B. If there were any errors with cached retrieval, execute "GC—Terminate Process".
   C. Write the cached data to the client.
   D. Exit this flow.
2. If there is no '*' anywhere in the argument passed:
   A. Retrieve the cached group metadata as well as the cached moderation flag for the group specified in the argument.
   B. Generate and send to the client the appropriately formatted response from the data retrieved.
3. Otherwise, open the cached ACTIVE file, send the first line of the file to the client unconditionally.
4. For each line read from the ACTIVE file, perform pattern matching on the group in the line against the argument passed. If a match is detected, send the line to the client.
5. The last line (the terminating ".\r\n") is always sent to the client unconditionally.

GC—Retrieve Cached List
1. If the requested list is not cached, indicate NODATA and exit this flow.
2. If the timestamp on the cached list is older than listexpire seconds old and listexpire is not 0, indicate NODATA and exit this flow.
3. Read the cached list into memory and indicate SUCCESS.

GC—Post Header Filter
1. If postd is enabled:
   A. If the header is 'date', record the fact that the date header has been sent.
   B. If the header is 'message-id', record the fact that the message-id header has been sent.
   C. If the header is NNTP-Posting-Date, NNTP-Posting-Host, Path, or X-GC-Moderated-Groups; drop the header entry and do not pass it to the backend server.
   D. If the header is 'newgroups', pull out moderated groups and create a new header to contain them called 'X-GC-Moderated-Groups'.
2. If the header is NNTP-Posting-Host or Path, drop the header entry and do not pass it to the backend server.
3. If the header is 'newgroups', ensure that the client has permission to post to those groups; if not, drop the header entry and do not pass it on to the backend server.

GC-Chop Xover Method
1. Arguments expected are: range, hdr, pat.
2. Get cached metadata on group (including lo- and hi-bounds).
3. If passed argument range is 'seed', then set the xover lo to the highest numbered xover article cached locally for the group; and xover hi to the group hi-bounds.
4. Else, if the passed argument range is in the form #-, set xover lo to the number in the argument and xover hi to the group hi-bounds.
5. Else, if the passed argument range is in the form of #-#, set xover lo to the first number in the argument and xover hi to the second number in the argument.
6. If necessary, adjust xover lo and xover hi to the group lo- and hi-bounds; also ensure that the xover lo is greater than or equal to the allowed retention of the group.
7. Execute "GC—Select Backend Server".
8. If xover lo is greater than or equal the lowest xover cached for the group and xover hi is less than or equal to the highest xover cached for the group:
   A. Return proper result code for the command executed:
      i. if (hdr!=NULL) "221% s fields follow (cached)", hdr
      ii. if (hdr=NULL) "224 xover information follows (cached)"
   B. Execute "GC—Pump Xover Method" with xover lo, xover hi, hdr, and pat as arguments.
   C. Send terminating ".\r\n".
   D. Exit this flow.
9. If xover lo is less than or equal to the highest cached xover +1 and xover hi is greater than or equal to the lowest cached xover −1:
   A. Return proper result code for the command executed:
      i. if (hdr!=NULL) "221% s fields follow (overlap)", hdr
      ii. if (hdr=NULL) "224 xover information follows (overlap)"

B. If xover lo is less than lowest xover cached, execute "GC—Suck Xover Method" with xover lo, lowest xover # cached −1, hdr, and pat. overlap lo=lowest xover # cached.
C. Else overlap lo=xover lo.
D. If xover hi>highest xover # cached, then overlap hi=highest xover # cached.
E. Else overlap hi=xover hi.
F. Execute "GC—Pump Xover Method" with overlap lo, overlap hi, hdr, pat.
G. If xover hi is greater than the highest xover # cached, then execute "GC—Suck Xover Method" with highest xover # cached, xover hi, hdr, and pat.
H. Send terminating ".\r\n".
I. Execute this flow.
10. If we have never cached anything for this group (lowest and highest # cached xover are both 0):
A. Return proper result code for the command executed:
i. if (hdr!=NULL) "221% s fields follow (overlap)", hdr
ii. if (hdr=NULL) "224 xover information follows (overlap)"
B. Execute "GC—Suck Xover Method" with xover lo, xover hi, hdr, and pat.
C. Send terminating ".\r\n".
D. Exit this flow.
11. Otherwise, Pass through the client's command verbatim to the backend server and send the resulting response to the client unmodified and uncached.

GC—Pump Xover Method
1. Arguments expected are: lo, hi, hdr, pat.
2. b=lo, c=1024.
3. Perform the following logic in a loop:
A. If b is greater than hi, exit this flow.
B. e=b+c.
C. If e is greater than hi, e=hi.
D. Retrieve the xover from the local cache listing only those fields specified in hdr, and matching pattern pat for the range of articles numbered b through e.
E. If the data is retrieved without error, write the results to the client.
F. If no data is returned from the local cache and lo equals hi, execute "GC—Suck Xover Method" with lo, hi, hdr, pat.
G. B=e+1.
H. Restart the loop at step #3.

GC—Suck Xover Method
1. Arguments expected are: lo, hi, hdr, pat.
2. If remaining drive space on the metadata storage device is less than 1% of the total drive space, or an attempt at locking the metadata file for the current client group fails:
A. Pass the customer command through to the backend server and return the results to the client without caching the data.
B. Exit this flow.
3. Get the cached group bounds for this group.
4. b=lo,c=256.
5. Perform the following logic in a loop:
A. If b is greater than hi, exit the loop and continue at step #6.
B. e=b+c.
C. If e is greater than hi, e=hi.
D. Send the request for xover for range b through e to the backend server.
E. Read response code line.
F. If code equals 224 and hdr is not NULL:
i. Put xover data into local cache database.
ii. Retrieve from the local cache database the data formatted according to hdr and matching pat.
iii. Return the retrieved information to the client.
G. Else if code=224 and hdr is NULL:
i. Pass the information unaltered directly back to the client.
ii. Put the xover data into the local cache database.
H. b=e+1
I. Restart the loop at step #5.
6. If data was written to the xover cache for the group, update the group's cached xover range in the metadata file for the group.
7. Unlock the metadata file for the group in question.

GC—Client Command Xover
1. Execute "GC—Chop Xover Method" with the arguments passed, NULL, NULL.

GC—Client Command XHDR
1. If the length of the argument=0, respond with "501 bad command usage" and exit this flow.
2. Change the process priority to be lower than normal due to the excess processing requirements of XHDR.
3. If no range was provided, use "0-0" as the range, else range is the last argument listed in the chain of arguments.
4. Execute "GC—Chop Xover Method" with range, hdr, NULL.

GC—Chop Article Method
1. Parameters are chop and argument.
2. If the argument length equals 0:
A. If there is no current client group, respond with "412 no group selected" and exit this flow.
B. num=current client article number.
C. msgid=message id from the local xover cache database if available, NULL if not.
D. args=num
3. Else if there is a currently selected client group and argument is numerical:
A. Validate the number from the argument as being in the allowed range of articles for the group by group bounds and allowed group retention. If not, respond with "423 no such article in group" and exit this flow.
B. msgid=message id from the local xover cache database if available, NULL if not.
4. Else:
A. num=0
B. msgid=arg
5. Client current article number=num
6. If msgid is not NULL:
A. Execute "GC—Get Article From Cache" with msgid
B. If the cached retrieval was successful, execute "GC—Actual Chop Article" with chop and the article data and exit this flow.
7. If msgid is not NULL and num equals 0:
A. Cluster status=execute "GC—Cluster Find Article" with msgid and 0.
B. If cluster status indicates that no server cluster server was found, execute "GC—Find Backend"
8. Else if msgid is not NULL and num is not 0, cluster status=execute "GC—Cluster Find Article" with msgid and −num.
9. Else if msgid is NULL, cluster status=execute "GC—Cluster Find Article" with the current client group and current client article number.

10. If chop is less than 0 (indicating HEAD):
   A. If cluster status !=NULL, send the HEAD command to the backend server.
      i. On success, pass the result back to the client.
      ii. On failure, connect to the true backend server and issue the head command and pass back the results to the client.
   B. Exit this flow.
11. Send ARTICLE command to the backend or cluster server and cache the article locally by executing "GC—Cache Article". If there was a failure in retrieving the ARTICLE and we were connected to a cluster-server, disconnect and connect to the true backend server and attempt step 11 again.
12. With the article in memory, execute "GC—Actual Chop Article" with chop and the article data.

GC—Actual Chop Article
1. Parameters are chop and article data.
2. If the article buffer does not contain "\r\n\r\n", respond to the client with "423 no such article in group" and exit this flow.
3. If chop is less than 0 (indicating HEAD):
   A. Respond with "221<article-number><msgid>".
   B. Send the headers from the in-memory article image to the client.
4. If chop is equal to 0 (indicating ARTICLE):
   A. Respond with "222<article-number><msgid>".
   B. Send the full article from the in-memory article image to the client.
5. If chop is greater than 0 (indicating BODY):
   A. Respond with "222<article-number><msgid>".
   B. Send the body from the in-memory article image to the client.

GC—Client Command ARTICLE
1. Execute "GC—Select Backend Server".
2. Execute "GC—Chop Article" with chop=0 and args=arguments to the command.

GC—Client Command BODY
1. Execute "GC—Select Backend Server".
2. Execute "GC—Chop Article" with chop=1 and args=arguments to the command.

GC—Client Command HEAD
1. Execute "GC—Select Backend Server".
2. Execute "GC—Chop Article" with chop=-1 and args=arguments to the command.

GC—Cluster Find Article
* See Data Def: Cluster Request Data Structure
1. Create request with information provided to function (as specified in the Data Def).
2. Broadcast the request on well known UDP ports in the cluster.
3. Wait for a response for a specific amount of time.
4. If no response is received in the time allotted, return NULL (indicating no cluster response received) and exit this flow.
5. Receive the response.
6. Validating the response is for the current request; if not, return NULL and exit this flow.
7. Change the backend server connection address to be that of the responding cluster server.
8. Return the msgid received from the cluster response.

GC—Find Backend
1. If multi-server mode is not enabled, exit this flow.
2. Perform a STAT command on the currently connected backend server. If the result is positive, exit this flow.
3. Connect to each server in the multi-server list in sequence and perform a STAT command for the msgid in question.
   A. If a server returns success, set that server to be the current backend server and exit this flow.
   B. If no server response, return indicating NOT FOUND.

GC—Get Cached Article
1. Expected arguments are group_or_msgid and num.
2. If request is by group:num, use the cached xover data to translate it to a msgid. If the msgid could not be retrieved from this data, return a failure to find the article and exit this flow.
3. Locate and check for the existence of the metastat file for the article. If the metadata file does not exist, return failure to find the article and exit this flow.
4. Read the metadata file into memory.
5. If the flags in the metadata file indicate the article is stored in a cyclic (JBOD) spool:
   A. Validate that the spool is operational, on a failure:
      i. Delete the article's metadata file.
      ii. Return failure to find the article and exit this flow.
   B. Open the spool file, on failure return failure to find the article and exit this flow.
   C. Seek to the offset indicated by the metadata.
   D. Read the article into memory. On error:
      i. Execute "GC—Article IO Error"
      ii. Return failure to find the article and exit this flow.
   E. Insure that artsize [2] is less than sizeof (artid), else return failure to find the article and exit this flow.
   F. Verify the msgid from the article data read from the cyclical spool and verify that it matches the article we are expecting. If not, return failure to find the article and exit this flow.
6. Else, read the article from the metadata file.
7. If the flags indicate that the article is compressed, decompress it in memory. On failure:
   A. Delete the article's metadata file.
   B. Return failure to find the article and exit this flow.
8. Return success in finding the article.

GC—Cache Article
1. Expected arguments are article data and length of article data.
2. Create an xover data structure from the headers of the article; on error, exit this flow.
3. If the article had no msgid or the msgid length was less than 3 or the msgid includes a '/', exit this flow.
4. Parse the age of the article from the date header or exit this flow.
5. If the age is less than 0 or greater than a configurable value called 'max-artdays', exit this flow.
6. If remaining drive space on the metadata storage device is less than a configurable amount, exit this flow.
7. If compression is enabled and the article size is greater than 32K:
   A. Add GC_DB_ARTICLE_COMPRESSED to the flags for the article.
   B. Compress the article in memory, on error exit this flow.
8. Execute "GC—GET Next Cyclic Spool", if no error:
   A. Execute "GC—Check Cyclic Spool", on failure, exit this flow.
   B. Add GC_DB_ARTICLE_CYCLIC to the flags on the article.

C. Write metadata to both the cyclic spool and the metadata file for the article.
D. Execute "GC—Advance Cyclic Spool".
E. Write the article data to the cyclic spool.
9. Else (indicative of "no-cyclical spool" mode):
   A. Open the article data file on the cache file system.
   B. Write the article metadata and data to the file.
10. Add the xover information gathered from the headers to the group's cached xover database.
11. If the article was not stored to a cyclical storage unit, append the msgid to the expire file for articles received in the current time.

GC—Article I/O Error
1. Log the error.
2. If the error was from a cyclical I/O, disable the spool from further use until human intervention re-enables it.

GC—Get Next Cyclical Spool
1. If cyclical spools have not been initialized, return and indicate that there are no cyclical spools available for use. Exit this flow.
2. Calculate the queue identifier corresponding to the age of the article to be cached.
3. If the queue is relatively new and does not have many spools, attempt to cycle the oldest spool on the system into the current queue.
4. If there are no spools in the queue with available space, also try to cycle the oldest spool on the system into the queue.
5. If there are still no spools in the queue with space available, return NO SPOOL AVAILABLE and exit this flow.
6. Select (in a round-robin fashion) the next spool in the queue to store the article in. Lock the spool.
7. Look in the spool and delete metadata file for any articles which the new article will overwrite in the spool.
8. Return the selected spool.

GC—Check Cyclical Spool
1. If the spool has been disabled, return FAIL.
2. Else, return SUCCESS.

GC—Advance Cyclical Spool
1. Update the current and next byte pointers in the spool.
2. Release the lock on the spool.

GC—Software Start for 'gc_cluster'
* See Data Def: Cluster Request Data Structure
1. Read configuration files and validate for correctness and authenticity using DSA signature algorithm.
2. Install signal handlers for various error conditions and termination requests.
3. Create listening sockets for cluster services.
4. Begin processing loop:
   A. Receive a request.
   B. If current CPU utilization is greater than a configurable value, drop the packet and restart the loop at step 4.
   C. If the packet is from the localhost or from a system not on our local cluster subnet, drop the packet and restart the loop at step 4.
   D. Check for the existence of the article on the local system by checking for the existence of the metadata file for the article. If the metadata file is not found, drop the packet and restart the loop at step 4.
   E. Generate a response packet using the following values in the request structure.
      i. num=port # of GC server
      ii. seq=seq # from the request
      iii. buf=msgid of the article
   F. Unicast the response to the source address/port of the request.

GC—Software Start for 'gc_cachesockd'
1. Read configuration files and validate for correctness and authenticity using DSA signature algorithm.
2. Install signal handlers for various error conditions and termination requests.
3. Create listening sockets for cluster services.
4. Begin processing loop (on any error, close the socket and restart the loop):
   A. Receive a request.
   B. If the request is a NEED request:
      i. Find the queue holding sockets for the requested IP:port combination. Expire old connections from the queue.
      ii. If no queue found, or the queue is empty, send a NONE response.
      iii. Else, send a TAKE response with the fd of the connection. Tag the client connection as PENDING GOT.
   C. If the request is a TAKE request:
      i. Find or create a queue for the IP:port combination.
      ii. Add the fd to the queue if space is available.
      iii. Send a GOT response to the client.
   D. If the request is a GOT request:
      i. If the connection is not tagged as PENDING GOT, disconnect the client connection.
      ii. Else close the local copy of the fd and remove the PENDING GOT. Tag from the connection.
   E. Restart the loop at Step 4.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A server system comprising:
a backend server;
a first communication link connected to the backend server;
a cluster of servers connected to the first communication link;
wherein each server in the cluster of servers is in communication with the other servers in the cluster of servers and
wherein at least one of the servers in said the cluster of servers stores retrieved articles from the backend server when the articles are requested by a customer;
a second communication link;
wherein the second communication link provides article requests from at least a first customer to the cluster of servers and provides at least one of the retrieved articles to the at least one customer; and
wherein the server system retrieves stored articles from the at least one server in the cluster of servers when a first requested article has been previously requested by a second customer and is stored in the at least one server in the cluster of servers.

2. The server system of claim 1, wherein a second server of the cluster of servers is retrieves the first requested article from the at least one of the servers in the cluster of servers when the customer requested article has already been requested from the backend servers due to a previous customer request for the first requested article.

3. The server system of claim 1, wherein the retrieved articles stored in the at least one server in the cluster of servers are each stored for a period of time until more storage space is required.

4. The server system of claim 1, wherein:
the retrieved articles stored in the at least one server in the cluster of servers are stored in a memory device divided into smaller sized data storage units; and
each data storage unit is dynamically assigned a time interval such that only articles originally posted within the dynamically assigned time interval are stored in each the storage unit.

5. The server system of claim 1, wherein the customer requests for articles can be fulfilled by retrieving the requested articles from the at least one server in the cluster of servers for about 20 to 90 percent of the customer requests for articles.

6. The server system of claim 1, wherein the first communications link is a TCP/IP communication session.

7. The server system of claim 1, wherein the communications link uses a Network News Transfer Protocol (NNTP).

8. The server system of claim 1, wherein each the server in the cluster of servers is adapted to be in communication with the other servers in the cluster of servers via a network connection.

9. The server system of claim 8, wherein the network connection comprises at least one of an wired connection, a wireless connection, an optical connection, and a satellite connection or link.

10. The server system of claim 1, wherein the second communications link is a TCP/IP session.

11. The server system of claim 1, wherein the second communications link uses a Network News Transfer Protocol (NNTP).

12. The server system of claim 1, wherein each server in the cluster of servers is a commodity server.

13. The server system of claim 1, wherein the backend server and the cluster of servers are geographically distant from each other.

14. A storage and retrieval system comprising:
a plurality of servers forming a server cluster,
each server of the plurality of servers having storage space for storing articles and data;
a communication network allowing each one of the plurality of servers to communicate with each other;
a backend server comprising storage space for storing articles,
the backend server being in communication with the server cluster via a first communication link;
wherein a first server of the plurality of servers accepts a request for a first article from a customer;
wherein the first server, via the communication network, queries the plurality of servers for the first article;
wherein if the first article is found in one of the plurality of servers storage space, the first article is provided to the first server for delivery to the customer; and
wherein the first article is not found in one of the plurality of server the first server requests the first article from the backend server.

15. The system of claim 14, wherein:
the backend server provides the first article to the first server for delivery to the customer; and
the first server stores the first article in the first server's storage space.

16. The system of claim 14, wherein the storage space of each one of the plurality of servers combined provides less article retention then the storage space of the backend server.

17. The system of claim 14, wherein when the first server queries the plurality of servers for the first article, the first article is found in one of the plurality of servers at least 20 percent of the time.

18. The system of claim 14, wherein the communication network comprises at least one of a wired connection, a wireless connection, an optical connection, and a satellite connection or link.

19. The system of claim 14, wherein the first communication link is a TCP/IP session.

20. The system of claim 14, wherein the backend server is geographically separated from the plurality of servers.

21. The system of claim 14, wherein the memory space of each the server of the plurality of servers is logically divided in smaller sized storage units such that each storage space is assigned a time interval for storing articles originally posted within the time interval.

22. The system of claim 21, wherein the backend server provides the first article to the first server for delivery to the customer and the first server stores the first article in a first storage space that is assigned a time interval that includes a date of the first article.

23. The system of claim 21, wherein the backend server provides the first article to the first server for delivery to the customer and wherein the first server attempts to store the first article in a first storage space such that, if there are only time interval storage spaces having time intervals newer than a date of the first article, then the first article is not stored in the first server.

24. The system of claim 21, wherein the backend server provides the first article to the first server for delivery to the customer and wherein the first server attempts to store the first article in a first storage space such that, if there are only time interval storage spaces having time intervals older than a date of the first article, then storage space having the oldest time interval is reassigned a time interval that includes the date of the first article and the first article is stored therein.

25. A method for providing news services comprising:
providing a local network cluster of news servers;
caching data and metadata related to news services with the news servers in the local network cluster;
receiving a request for news services from a client associated with the local network cluster;
determining whether the requested news services are available from the news servers in the local network cluster;
if so, retrieving the requested news services from the news servers in the local network cluster and providing the requested news services to the client directly from the local network cluster; and
if not, creating a session to one of at least one backend server(s) to retrieve the requested news services.

26. The method of claim 25, wherein the requested news services are retrieved from the one backend server in a compressed format.

27. The method of claim 25, further comprising: storing the retrieved requested news service; providing the retrieved requested news service to the client; and storing the retrieved requested news service in at least one of the news servers.

* * * * *